US007706905B2

(12) United States Patent
Oh et al.

(10) Patent No.: US 7,706,905 B2
(45) Date of Patent: Apr. 27, 2010

(54) METHOD FOR PROCESSING AUDIO SIGNAL

(75) Inventors: Hyen-O Oh, Gyeonggi-do (KR); Hee Suk Pang, Seoul (KR); Dong Soo Kim, Seoul (KR); Jae Hyun Lim, Seoul (KR); Hyo Jin Kim, Seoul (KR); Yang-Won Jung, Seoul (KR)

(73) Assignee: LG Electronics Inc., Seoul (KR)

(*) Notice: Subject to any disclaimer, the term of this patent is extended or adjusted under 35 U.S.C. 154(b) by 5 days.

(21) Appl. No.: 11/997,321

(22) PCT Filed: Jul. 28, 2006

(86) PCT No.: PCT/KR2006/002984

§ 371 (c)(1),
(2), (4) Date: May 6, 2008

(87) PCT Pub. No.: WO2007/013783

PCT Pub. Date: Feb. 1, 2007

(65) Prior Publication Data

US 2008/0219475 A1 Sep. 11, 2008

Related U.S. Application Data

(60) Provisional application No. 60/703,463, filed on Jul. 29, 2005, provisional application No. 60/716,526, filed on Sep. 14, 2005, provisional application No. 60/816,022, filed on Jun. 22, 2006.

(30) Foreign Application Priority Data

| | | |
|---|---|---|
| Jan. 13, 2006 | (KR) | 10-2006-0004048 |
| Feb. 23, 2006 | (KR) | 10-2006-0017659 |
| Feb. 23, 2006 | (KR) | 10-2006-0017660 |

(51) Int. Cl.
*G06F 17/00* (2006.01)

(52) U.S. Cl. .......... 700/94; 381/19

(58) Field of Classification Search .......... 700/94; 381/1, 2, 10, 17, 18, 19, 20, 21, 22, 23
See application file for complete search history.

(56) References Cited

U.S. PATENT DOCUMENTS 5,682,461 A 10/1997 Silzle (Continued)

FOREIGN PATENT DOCUMENTS

KR 10-0008641 12/1979

(Continued)

OTHER PUBLICATIONS

Erik Demaine, 6.897: Advanced Data Structures Lecture 12 (Apr. 7, 2003), 10 pages.*

(Continued)

*Primary Examiner*—Walter F Briney, III
(74) *Attorney, Agent, or Firm*—Fish & Richardson P.C.

(57) ABSTRACT

A method for processing an audio signal during the multichannel audio coding is disclosed. The present invention provides the method for processing an audio signal comprising: generating a fixed output channel using a down-mix signal and a basic matrix; and generating an arbitrary output channel using the fixed output channel and a post matrix.

6 Claims, 5 Drawing Sheets

U.S. PATENT DOCUMENTS

| | | | | |
|---|---|---|---|---|
| 6,021,386 | A | 2/2000 | Davis | |
| 7,299,190 | B2 | 11/2007 | Thumpudi et al. | |
| 7,492,789 | B2 | 2/2009 | Shvodian | |
| 2003/0035553 | A1 | 2/2003 | Baumgarte et al. | |
| 2004/0044527 | A1 * | 3/2004 | Thumpudi et al. | .......... 704/230 |
| 2006/0115100 | A1 | 6/2006 | Faller | |
| 2006/0116886 | A1 | 6/2006 | Kim et al. | |
| 2006/0133618 | A1 | 6/2006 | Villemoes et al. | |
| 2006/0153408 | A1 | 7/2006 | Faller et al. | |
| 2006/0288117 | A1 | 12/2006 | Raveendran et al. | |
| 2007/0076680 | A1 | 4/2007 | Amram et al. | |
| 2007/0206592 | A1 | 9/2007 | Itakura et al. | |
| 2008/0219475 | A1 | 9/2008 | Oh et al. | |
| 2008/0228475 | A1 | 9/2008 | Oh et al. | |
| 2008/0228499 | A1 | 9/2008 | Oh et al. | |
| 2008/0255856 | A1 | 10/2008 | Schuijers et al. | |
| 2008/0304513 | A1 | 12/2008 | Oh et al. | |
| 2009/0006105 | A1 | 1/2009 | Oh et al. | |

FOREIGN PATENT DOCUMENTS

| | | |
|---|---|---|
| KR | 10-1998-0075447 | 11/1998 |
| WO | 03/090206 | 10/2003 |
| WO | 03/090207 | 10/2003 |
| WO | 03/090208 | 10/2003 |
| WO | WO03/090206 A1 | 10/2003 |
| WO | 2007/007263 | 1/2007 |
| WO | WO03/090207 A1 | 10/2008 |

OTHER PUBLICATIONS

Herre et al., An Introduction to MP3 Surround (Archived by WatBackMachine Dec. 2004 at http://web.archive.org/web/20041209032907/www.iis.fraunhofer.de/amm/download/mp3surround/technology/introduction_to_mp3surround.pdf; Retrieved May 29, 2009), 9 pages.*

Howard Fosdick, Rexx Programmer's Reference (Mar. 2005), 5 pages.*

International Search Report in corresponding International application No. PCT/KR2006/002974, dated Nov. 17, 2006, 1 page.

Notice of Allowance dated Feb. 24, 2009 by the Korean Patent Office (10-2008-7004586), 2 pages.

J. Herre, et al., "The Reference Model Architecture for MPEG Spatial Audio Coding", AES 118th Convention, May 28-31, 2005.

Christof Faller, "Parametric Coding of Spatial Audio", Proc. of the 7th DAFx '04, Naples Italy, Oct. 5-8, 2004.

ISO/IEC 13818-2, Nov. 1993, Seoul Korea.

Han-Gil Moon, et al., "A Multi-Channel Audio Compression Method With Virtual Source Location Information for MPEG-4 SAC", IEEE Trans. on Consumer Electronics, vol. 51, No. 4, Nov. 2005.

Herre et al., An introduction to MP3 Surround (Archived by WayBackMachine Dec. 2004 at http:/web.archive.org/web/20041209032907/www.iis.fraunhofer.de/amm/download/mp3surround/technology/introduction_to_mp3surround.pdf; Retrieved May 29, 2009), 9 pages.

USPTO Non-final Action in U.S. Appl. No. 11/997,318, dated Jan. 22, 2009, 12 pages.

USPTO Non-final Action in U.S. Appl. No. 11/997,318, dated May 18, 2009, 6 pages.

USPTO Non-final Action in U.S. Appl. No. 11/997,317, dated Jun. 10, 2009, 17 pages.

USPTO Non-final Action in U.S. Appl. No. 11/997,319, dated Jun 12, 2008, 25 pages.

USPTO Final Action in U.S. Appl. No. 11/997,318, dated Aug. 21, 2009, 6 pages.

USPTO Non-final Action in U.S. Appl. No. 11/997,314, mailed Aug. 31, 2009, 14 pages.

* cited by examiner

METHOD FOR PROCESSING AUDIO SIGNAL

TECHNICAL FIELD

The present invention relates to a multi-channel coding method, and more particularly to a method for processing an audio signal.

BACKGROUND ART

Generally, signals may be configured in various ways (e.g., a block, a band, and a channel.). The above-mentioned signals can be processed without being divided into several units within in a stationary period in which signals can maintain predetermined statistical characteristics because it is an advantage to compress the signals.

It is preferable for the signal to be divisionally processed in a transient period in which signal characteristics are abruptly changed, because of the prevention of signal distortion.

However, if a user desires to divisionally process the above-mentioned signals, there is no detailed method for signaling the divided information. Therefore, it is difficult to effectively process the above-mentioned signals.

DISCLOSURE OF INVENTION

Accordingly, the present invention is directed to a method for signaling division information that substantially obviates one or more problems due to limitations and disadvantages of the related art.

An object of the present invention devised to solve the problem lies on a method for effectively signaling divided signals.

The object of the present invention can be achieved by providing a method for processing an audio signal comprising: generating a fixed output channel using a down-mix signal and a basic matrix; and generating an arbitrary output channel using the fixed output channel and a post matrix.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
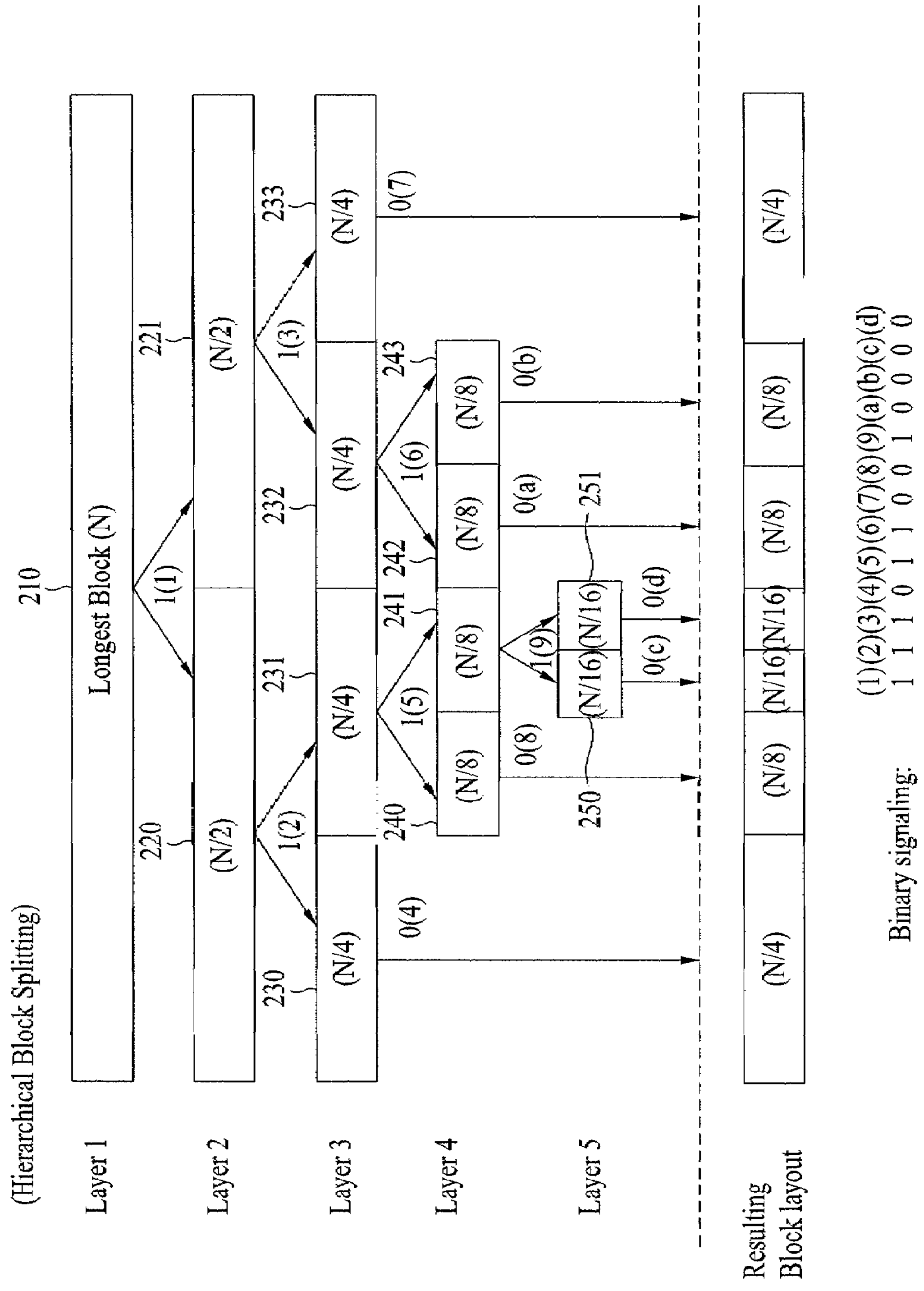
FIG. 1 is a conceptual diagram illustrating a signaling method for block division information according to an embodiment of the present invention.

Reference will now be made in detail to the preferred embodiments of the present invention, examples of which are illustrated in the accompanying drawings.

A signaling method for division information (also called "splitting information") according to the present invention will hereinafter be described with reference to the annexed drawings.

The signaling method for the division information according to the present invention is classified according to signal categories.

Prior to describing the present invention, it should be noted that the above-mentioned signal is configured in various ways, for example, a block, a band, and a channel.

The above-mentioned "Signaling method" may include the meaning of "Signaling" or the meaning of "Recognition of the signaled signal".

The term "Node" is a point indicating whether the signal is divided or not.

The term "Spatial Information" is information capable of downmixing or upmixing a multi-channel signal.

It should be noted that the spatial information is indicative of spatial parameters, however, it is not limited to the above-mentioned examples, and can be applied to other examples as necessary.

The above-mentioned spatial parameters are a Channel Level Difference (CLD) indicating a difference in energy between two channels, Inter-Channel Coherences (ICC) indicating correlation between two channels, and Channel Prediction Coefficients (CPC) used for creating three channels from two channels.

Block division, band division, and channel division will hereinafter be described in detail.

1) Block Division

A block processing is required to compress consecutive data of a time domain in the same manner as in audio signals.

The term "Block Processing" indicates that an input signal is divisionally processed at intervals of a predetermined distance.

In this case, the above-mentioned interval is defined as a block, and one or more blocks are combined to configure a frame.

The above-mentioned frame is indicative of a unit for transmitting/storing data.

The term "Block Division" or "Block Splitting" is indicative of a specific process in which an input signal is changed to different-sized blocks during the signal processing.

The term "Block Size Information" is specific information indicating a block size acquired when the input signal is processed while being changed to different-sized blocks.

Generally, if the signal is configured in the form of a block, the signal processing is performed using a long block or a short block.

In the case of using the short block, several short blocks are combined, and the combined blocks correspond to a single long block.

However, the signal has various characteristics for every interval, such that it is difficult to conclusively determine that all the signals can be processed according to the long-block signal processing scheme and the short-block signal processing scheme.

Preferably, a specific-sized block is selected from among different-sized blocks suitable for signal characteristics within a specific interval, and the block division is then performed on the selected block.

In more detail, blocks are configured to have two or more different sizes. A predetermined-sized block from among the two or more different-sized blocks can be selected from the frame in various ways.

For this purposes, there is a need to indicate which blocks are contained in a current frame, such that the signaling method is required for the above-mentioned operations.

The above-mentioned signaling method is classified into a sequential signaling method and a hierarchical signaling method.

The sequential signaling method pre-defines the frame size (i.e., length denoted by "N"), and performs the signaling process using the number of minimum-sized blocks M.

In this case, the frame length "N" is a multiple of a specific M. The frame size may be a fixed value, or may be a specific value capable of being transmitted to a destination as additional information.

For example, provided that N is 2048 (N=2048), M is 256 (M=256), and the blocks are arranged in the order of 256→256→1024→512, block size information may be signaling-processed in the order of M*1, M*1, M*4, M*2→1, 1, 4, 2→0, 0, 3, 1.

The hierarchical signaling method may be classified into a method for transmitting layer's depth information and a method for not transmitting the layer's depth information and a detailed description thereof will hereinafter be described with reference to the annexed drawings.

FIG. 1 is a conceptual diagram illustrating a signaling method for block division information according to an embodiment of the present invention.

Referring to FIG. 1, each layer is denoted by a layer, and the depth of the layer is set to "5".

A "Layer 1" includes a first block 210, which is the longest block used as a basic unit for block division, and the length of the first block 210 is N.

Reference numbers (1), (2), . . . , (a), (b), (c), and (d) indicate exemplary binary signaling sequences.

According to the present embodiment, the block division information indicating whether the block is divided or not is represented by a division ID (identifier) and a non-division ID. A specific number "1" is used as the division ID, and a specific number "0" is used as the non-division ID.

The above-mentioned division ID and the non-division ID are represented in nodes for each layer.

The division ID indicates that a predetermined block contained in an upper layer is divided into equal halves in a lower layer, and also indicates that a lower node is assigned to the lower layer.

The non-division ID indicates that a predetermined block of the upper layer is not divided by the lower layer, and also indicates that any lower node corresponding to a node which is represented by the non-division ID is not assigned to the lower layer. To un-assign the lower node means that there is no performing additional signaling operations.

Since the block division information (1) of the first block 210 has the value of 1 in the uppermost layer (i.e., the Layer 1), the block division of the first block 210 is performed.

Layer 2 acting as the lower layer of the Layer 1 includes two blocks 220 and 221, each of which has the length of N/2.

Block division information (2) of the block 220 contained in the Layer 2 has the value of "1", and block division information (3) of the block 221 has the value of "1", such that Layer 3 acting as a lower layer of the Layer 2 includes four blocks 230, 231, 232, and 233, each of which has the length of N/4.

The block division information (4) associated with the block 230 contained in the Layer 3 has the value of "0". The block division information (5) associated with the block 231 3 has the value of "1". The block division information (6) associated with the block 232 has the value of "1". The block division information (7) associated with the block 233 contained in the Layer 3 has the value of "0".

Therefore, according to the block division information of the Layer 3, the block division is not performed on the blocks 230 and 233 of the Layer 3, but is performed on the blocks 231 and 232 of the Layer 3.

In this case, a lower node is not assigned to a Layer 4 acting as a lower layer of the above-mentioned non-block-divided blocks 230 and 233 of the Layer 3.

The block-divided blocks 231 and 232 of the Layer 3 assign a lower node to a lower layer. And the presence or absence of block division is represented in the lower node.

Layer 4 has the length of N/8, and includes blocks 240 and 241 which are divided on block 231 of the Layer 3, and also includes other blocks 242 and 243 are divided on block 232 of the Layer 3.

The block division information (8) associated with the block 240 of the Layer 4 has the value of "0". The block division information (9) associated with the block 241 of the Layer 4 has the value of "1". The block division information (a) associated with the block 242 of the Layer 4 has the value of "0". The block division information (b) associated with the block 243 of the Layer 4 has the value of "0".

Therefore, according to the block division information of the Layer 4, the block division is not performed on the blocks 240, 242, and 243 of the Layer 4, but is performed on the block 241 of the Layer 4.

In this case, a lower node is not assigned to a Layer 5 acting as a lower layer of the above-mentioned non-block-divided blocks 240, 242, and 243 of the Layer 4.

The block-divided block 241 of the Layer 4 assigns a lower node to the Layer 5, such that it indicates the presence or absence of block division in the above-mentioned lower node.

The Layer 5 has the length of N/16, and includes blocks 250 and 251 which are divided on block 241 of the Layer 4.

The block division information (c) associated with the block 250 of the Layer 5 has the value of "0". The block division information (d) associated with the block 251 of the Layer 5 has the value of "0".

Therefore, each of the blocks contained in the Layer 4 has the value of "0", such that the hierarchical block division is not performed any more, and a block division depth of the block can be recognized.

The layout structure of blocks capable of being hierarchically-block-divided includes an N/4 block (i.e., a block having the length of N/4), an N/8 block, an N/16 block, an N/16 block, an N/8 block, an N/8 block, and an N/8 block.

If the signal length is N, block-divided blocks have any one of the lengths (i.e., N/2, N/4, N/8, N/16, and N/32 . . . ), as represented by "$N/x^i$" (where i=1, 2, . . . , P, P is an integer, and x=2).

In the case of representing block division information capable of being denoted by a binary number according to binary signaling sequences (1) (2)(3)(4)(5)(6)(7)(8)(9)(a)(b)(c)(d), the block division information can be denoted by 13 bits "1110110010000".

The above-mentioned description has disclosed an exemplary case in which the layer's depth information is not additionally represented, and can be recognized by only block division information denoted by the division ID and non-division ID.

However, it should be noted that the other block division information for additionally representing the layer's depth information can also be signaling-processed.

For example, the layer's depth information is represented by a division-termination ID and a division-continuation ID.

The above-mentioned division-termination ID is indicative of the lowermost layer in which block division is not performed any more. The above-mentioned division-continuation ID is indicative of the remaining layers except the lowermost layer. In this case, the division-continuation ID is denoted by "1", and the division-termination ID is denoted by "0".

The depth of the layer depicted in FIG. 1 is "5", and can also be represented by "11110" using the division-termination ID "0" and the division-continuation ID "1".

The size of a sub-block can be recognized by the above-mentioned signaling method.

In this way, in the case of additionally representing the depth information, only the non-division ID can be represented at a node assigned to the lowermost layer, such that the signaling process can be performed in the range from a current layer to a previous layer of the lowermost layer.

For example, provided that the division ID is denoted by "1" and the non-division ID is denoted by "0" and the division-continuation ID is denoted by "1" and the division-termination ID is denoted by "0", a specific value indicating whether the node assigned to the lowermost layer is divided may be represented by "0" indicating the division termination.

2) Band Division

Band division will hereinafter be described with reference to FIGS. 2~3.

Figure 2:
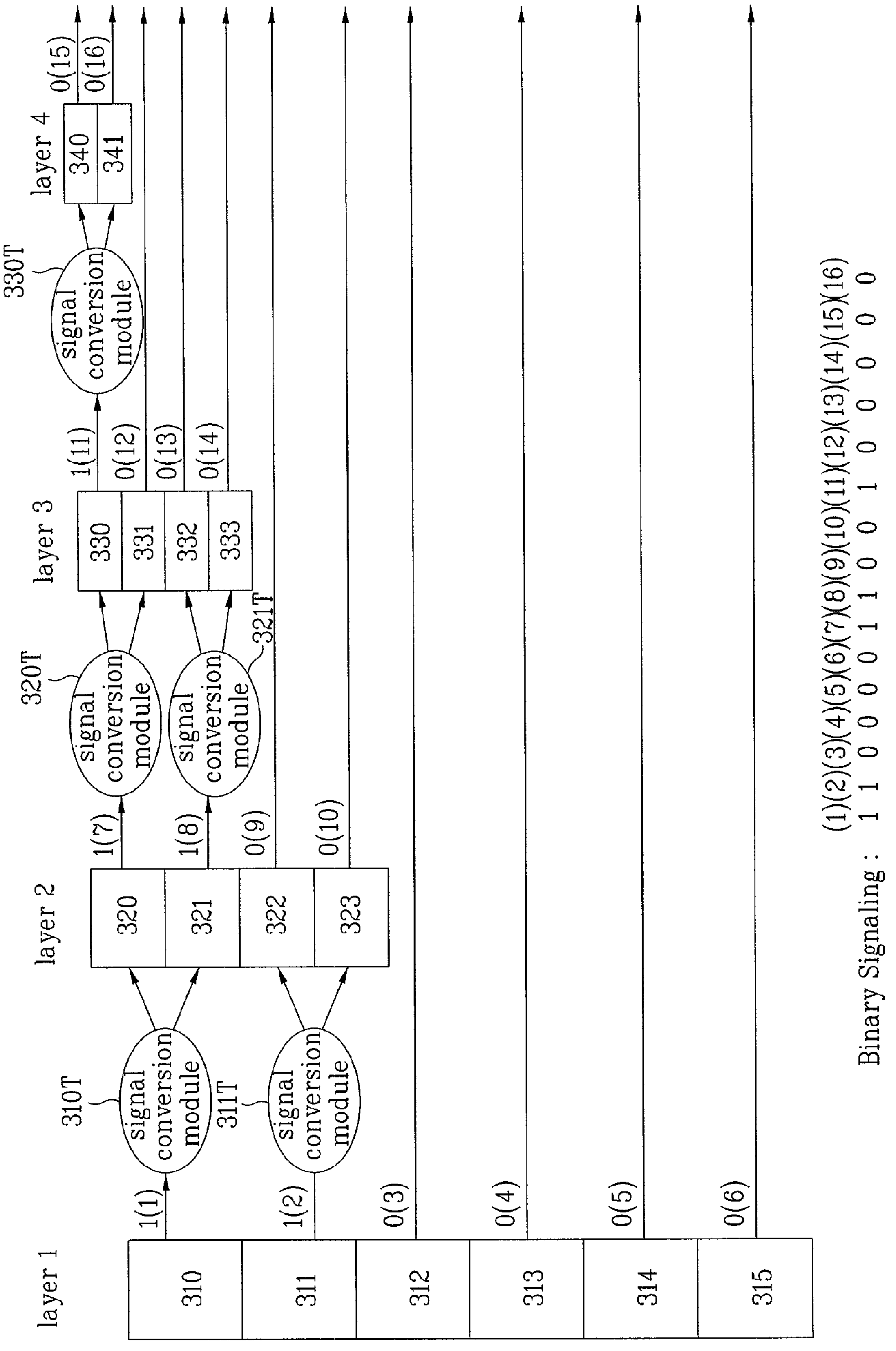
FIG. 2 and FIG. 3 are conceptual diagram illustrating a signaling method for band and channel division information according to an embodiment of the present invention.

FIG. 2 is a conceptual diagram illustrating a method for signaling band division information according to another embodiment of the present invention.

FIG. 2 shows hierarchical band division configured in the structure of a tree in a sub-band filterbank. A frequency resolution of the sub-band can be defined in various ways, and a detailed description thereof will hereinafter be described in detail.

Compared with the block division of FIG. 1, the band division of FIG. 2 includes a plurality of bands in the uppermost layer, whereas an uppermost layer of FIG. 1 is composed of a single long block.

According to the present embodiment, the band division information indicating whether the band is divided or not is represented by the division ID and the non-division ID. The value of "1" is used as the division ID, and the value of "0" is used as the non-division ID.

The division ID and the non-division ID can be indicated at nodes for each layer.

The division ID indicates that a band of an M-th layer is divided into equal halves at an (M+1)-th layer.

The non-division ID indicates that a band of the M-th layer is not divided at the (M+1)-th layer and also indicates that that any lower node corresponding to a node which is represented by the non-division ID is not assigned to the lower layer. To un-assign the lower node means that there is no performing additional signaling operations.

The Layer 1 acting as the uppermost layer includes first to sixth bands 310, 311, 312, 313, 314, and 315.

Band division information (1) of the first band 310 is denoted by "1". Band division information (2) of the second band 311 is denoted by "1". Band division information (3) of the third band 312 is denoted by "0". Band division information (4) of the fourth band 313 is denoted by "0". Band division information (5) of the fifth band 314 is denoted by "0". Band division information (6) of the fourth band 313 is denoted by "0".

The above-mentioned band division information is indicated at the node assigned to the Layer 1.

According to the band division information (1) and (2), the first band 310 creates a signal conversion module 310T, and the second band 311 creates a signal conversion module 311T, such that lower bands 320, 321, 322, and 323 are created in the Layer 2. Lower nodes are assigned to the lower bands 320, 321, 322, and 323. It should be noted that the above-mentioned signal conversion module can also be called a "band conversion module" in the present embodiment.

In the meantime, the third, fourth, fifth, or sixth band 312, 313, 314, or 315 at which there is no band division does not create the band conversion module. Lower bands corresponding to the Layer 2 are not also created in the third, fourth, fifth, or sixth band 312, 313, 314, or 315. Therefore, any lower node corresponding to 312, 313, 314 and 315 is not assigned to the layer 2.

The Layer 2 includes two bands 320 and 321 which are divided on the band 310 of the layer 1, and also includes two bands 322 and 323 which are divided on the band 311 of the layer 1.

Band division information (7) of the band 320 is denoted by "1". Band division information (8) of the band 321 is denoted by "1". Band division information (9) of the band 322 is denoted by "0". Band division information (10) of the band 323 is denoted by "0".

According to the above-mentioned band division information (7) and (8), the band 320 creates a band conversion module 320T, and the band 321 creates a band conversion module 321T, such that lower bands 330, 331, 332, and 333 are created in the Layer 3. Lower nodes are assigned to the lower bands 330, 331, 332, and 333.

In the meantime, the bands 322 and 323 at which there is no band division does not create the band conversion module. Lower bands corresponding to the Layer 3 are not also created in the bands 322 and 323. Therefore, a lower node is also not assigned to the bands 322 and 323.

The Layer 3 includes two bands 330 and 331 which are divided on the band 320 of the layer 2, and also includes two bands 332 and 333 which are divided on the band 321 of the layer 2.

Band division information (11) of the band 330 is denoted by "1". Band division information (12) of the band 331 is denoted by "0". Band division information (13) of the third band 332 is denoted by "0". Band division information (14) of the band 333 is denoted by "0".

According to the above-mentioned band division information (11), the band 330 creates a signal conversion module 330T, and the lower bands 340 and 341 are created in the Layer 4. Lower nodes are assigned to the lower bands 340 and 341.

In the meantime, the bands 331, 332, and 333 at which there is no band division does not create the band conversion module. Lower bands corresponding to the Layer 4 are not also created in the bands 331, 332, and 333. Therefore, a lower node is also not assigned to the bands 322 and 323. Therefore, a lower node is also not assigned to the bands 331, 332, and 333.

The Layer 4 includes two bands 340 and 341 331 which are divided on the band 330 of the layer 3.

Band division information (15) of the band 340 is denoted by "0". Band division information (16) of the band 341 is denoted by "0".

Therefore, there is no lower layer capable of performing the band division, and the signaling process is terminated. In this case, the lowermost layer is equal to the Layer 4.

In the case of representing block division information capable of being denoted by a binary number according to binary signaling sequences (1) (2)(3)(4)(5)(6)(7)(8)(9)(10) (11)(12)(13)(14)(15)(16), the block division information can be denoted by 16 bits "1100001100100000".

Figure 3:
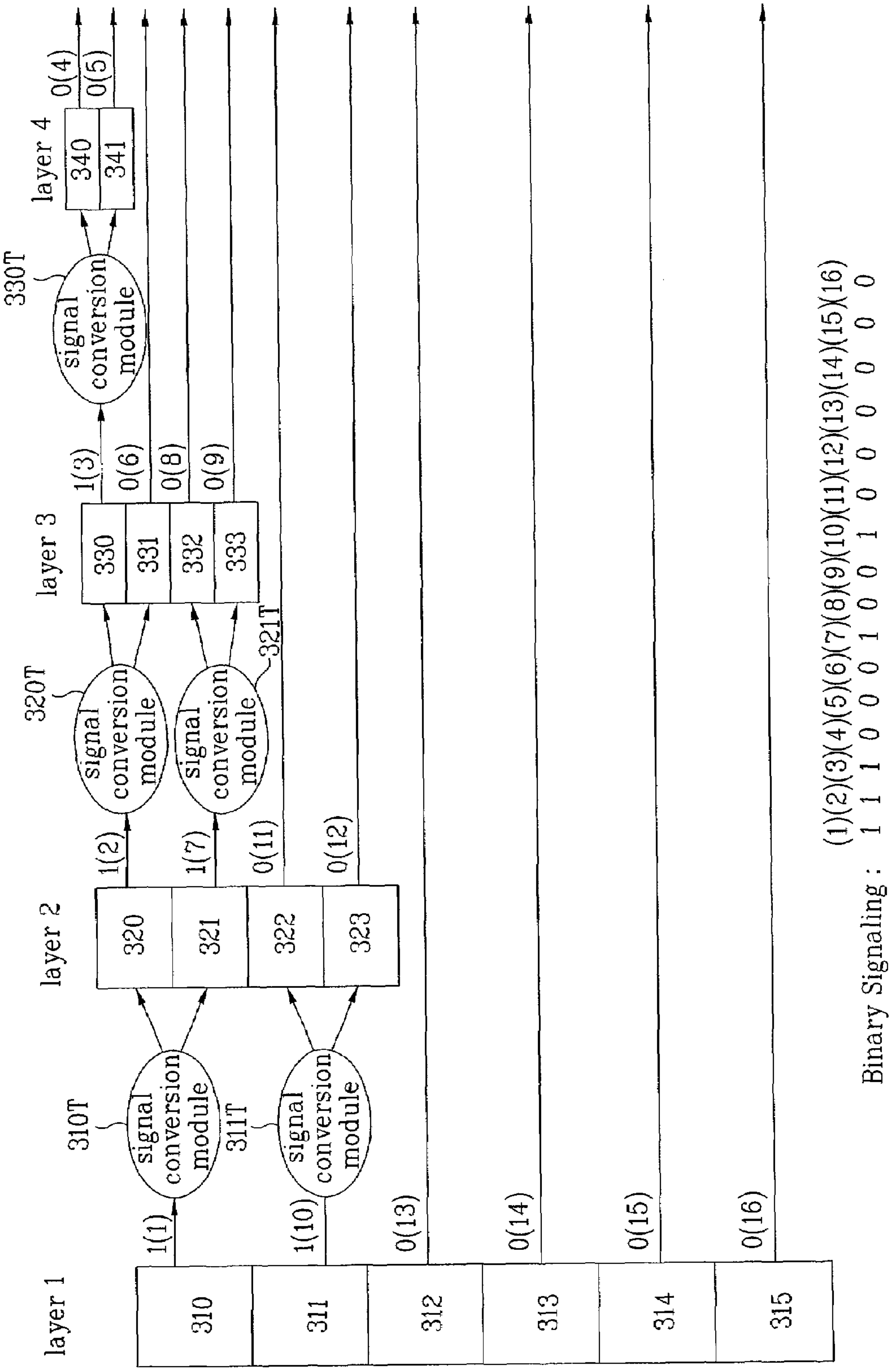

FIG. 3 is a block diagram illustrating a signaling method for band division information according to another embodiment of the present invention.

Compared with FIG. 2, the band division of FIG. 3 is similar to that of FIG. 2 in light of a method for performing the band division.

However, as shown in FIG. 3, a binary signaling sequence of the band division information in FIG. 3 is different from that of FIG. 2.

Therefore, in the case of representing block division information capable of being denoted by a binary number according to binary signaling sequences (1) (2)(3)(4)(5)(6)(7)(8)(9) (10)(11)(12)(13)(14)(15)(16), the block division information can be denoted by 16 bits "1110001001000000".

The above-mentioned description has disclosed an exemplary case in which the layer's depth information is not additionally represented, and can be recognized by only band division information denoted by the division ID and non-division ID.

However, it should be noted that the other band division information for additionally representing the layer's depth information can also be signaling-processed.

For example, the layer's depth information is represented by a division-termination ID and a division-continuation ID.

The above-mentioned division-termination ID is indicative of the lowermost layer in which band division is not performed any more. The above-mentioned division-continuation ID is indicative of the remaining layers except the lowermost layer. In this case, the division-continuation ID is denoted by "1", and the division-termination ID is denoted by "0".

The depth of the layer depicted in FIGS. 2~3 is "4", and can also be represented by "1110" using the division-termination ID "0" and the division-continuation ID "1".

The size of a sub-band can be recognized by the above-mentioned signaling method.

In this way, in the case of additionally representing the depth information, only the non-division ID can be represented at a node assigned to the lowermost layer, such that the signaling process can be performed in the range from a current layer to a previous layer of the lowermost layer.

For example, provided that the division ID is denoted by "1" and the non-division ID is denoted by "0" and the division-continuation ID is denoted by "1", and the division-termination ID is denoted by "0", a specific value indicating whether the node assigned to the lowermost layer is divided may be represented by "0" indicating the division termination.

3) Channel Division

Channel division information relates to channel configuration information used for channel configuration, such that a detailed description of channel division will hereinafter be described with reference to the above-mentioned channel configuration information.

Particularly, an example of channel configuration acquired when a multi-channel audio signal is encoded or decoded will be described in detail.

Basic spatial information is required for coding the multi-channel audio signal. The above-mentioned basic spatial information includes basic configuration information capable of indicating configuration information associated with basic environments and basic data corresponding to the basic configuration information.

Also, the multi-channel audio coding selectively requires extension spatial information. The above-mentioned extension spatial information includes extension configuration information indicating configuration information associated with extension environments and extension data corresponding to the extension configuration information. The configuration information of the above-mentioned extension environment may exist one or more. The above-mentioned extension environment can be identified by a type ID.

In the meantime, the channel configuration referred by the above-mentioned multi-channel signal coding is mainly classified into two channel configurations, i.e., a basic channel configuration and an extension channel configuration.

One or more channel configuration information is used as the above-mentioned basic channel configuration information. Particularly, the basic channel configuration information indicates a single channel configuration information selected from among several channel configuration information.

For the convenience of description, the basic channel configuration information is referred to as "fixed channel configuration information", and multiple channels (i.e., a multi-channel) created by the fixed channel configuration information is referred to as a "fixed output channel".

Fixed channel configuration information and associated channel configuration data are required to create the above-mentioned fixed output channel.

The fixed channel configuration information is indicative of a single channel configuration component from among several pre-established channel configuration components. The above-mentioned pre-established channel configuration may be represented in various ways. For example, the channel may be configured in the form of "5-1-5", "5-2-5", "7-2-7", or "7-5-7".

The above-mentioned "5-2-5" configuration is indicative of a specific channel structure in which six input channels are down-mixed in two channels, and the down-mixed channels is outputted to six channels. The remaining channel configurations other than the "5-2-5" configuration have the same channel structure as that of the "5-2-5" configuration.

The above-mentioned fixed channel configuration information is contained in the basic configuration information, and data associated with the fixed channel configuration information is contained in basic data.

A variety of parameters may be used as the above-mentioned basic data, for example, a Channel Level Difference (CLD) parameter indicating a difference in energy between two channels, an Inter-Channel Coherences (ICC) parameter indicating correlation between two channels, and a Channel Prediction Coefficients (CPC) parameter used creating three channels from two channels.

The above-mentioned extension channel configuration indicates a channel configuration formed after the fixed channel configuration.

The above-mentioned extension channel configuration is arbitrarily formed by encoded signals. For the convenience of description, the extension channel configuration information is referred to as arbitrary channel configuration information, and the multi-channel created by the arbitrary channel configuration information is referred to as an arbitrary output channel.

The above-mentioned arbitrary channel configuration information is contained in the extension configuration information, and is identified by a type ID called a channel ID.

The arbitrary channel configuration data corresponding to the arbitrary channel configuration information is contained in the extension data.

If required, the above-mentioned arbitrary channel configuration data may use only the CLD parameter indicating a difference in energy between two channels for a simple operation.

The arbitrary channel configuration information is represented by the division ID and the non-division ID. The division ID acting as a constituent element of the above-mentioned arbitrary channel configuration information indicates the increase the number of channels. The non-division ID indicates a specific case in which there is no change in the number of channels.

For example, the division ID indicates that one input channel is converted to two output channels. Non-division ID indicates that an input channel is outputted without any change of number of channels.

In the case of representing the division ID at a node of an upper layer assigned to the channel of the upper layer, lower channels are created in the lower layer, and lower nodes corresponding to the created channels are assigned to the lower layer.

However, in the case of representing the non-division ID at the node of the upper layer assigned to the channel of the upper layer, the lower channels are not created in the lower layer, such that lower nodes corresponding to the lower channels are not assigned to the lower layer.

A method for representing the above-mentioned arbitrary channel configuration information using the division ID and the non-division ID will hereinafter be described with reference to FIGS. 2~3.

FIGS. 2~3 show not only the above-mentioned band division but also channel division.

Detailed description of FIG. 2 will be firstly described as follows.

The Layer 1 acting as the uppermost layer includes six bands 310, 311, 312, 313, 314, and 315. The aforementioned bands 310, 311, 312, 313, 314, and 315 may serve as the above-mentioned fixed multi-channels, respectively. According to the present invention, the division ID is denoted by "1", and the non-division ID is denoted by "0".

A method for representing the arbitrary channel configuration information sequentially indicates the value "0" or 1" contained in the nodes assigned to the channels 310, 311, 312, 313, 314, and 315 of the Layer 1.

The method for representing the arbitrary channel configuration information sequentially indicates the value "0" or 1" contained in the nodes assigned to the channels 320, 321, 322, and 323 of the Layer 2.

The method for representing the arbitrary channel configuration information sequentially indicates the value "0" or 1" contained in the nodes assigned to the channels 330, 331, 332, and 333 of the Layer 3.

The method for representing the arbitrary channel configuration information sequentially indicates the value "0" or 1" contained in the nodes assigned to the channels 340 and 341 of the Layer 4.

In other words, the above-mentioned method sequentially indicates whether the number of channels increases at nodes of the upper layer, and then sequentially indicates whether the number of channels increases at nodes of the lower layer.

The arbitrary channel configuration information according to the above-mentioned method is represented by 16 bits "1100001100100000".

For the convenience of description, the method for representing the arbitrary channel configuration information is referred to as a "hierarchical priority method".

According to the method for representing the arbitrary channel configuration information as shown in the FIG. 3, if a first node of a upper layer is denoted by "1" when the signaling result is acquired from the first node of the upper layer, lower nodes corresponding to the first node of the upper layer indicate whether the number of channels sequentially increases. If the first node of the upper layer is denoted by "0" when the signaling result is acquired from the first node of the upper layer, a current node moves to a second node of the upper, such that the second node indicates that the number of channels sequentially increases. Therefore, the arbitrary channel configuration information acquired by the above-mentioned method is represented by 16 bits "1110001001000000".

For the convenience of description, the method for representing the arbitrary channel configuration information is referred to a "branch priority method".

A method for creating the fixed output channel and the arbitrary output channel will hereinafter be described with reference to FIG. 4.

Figure 4:
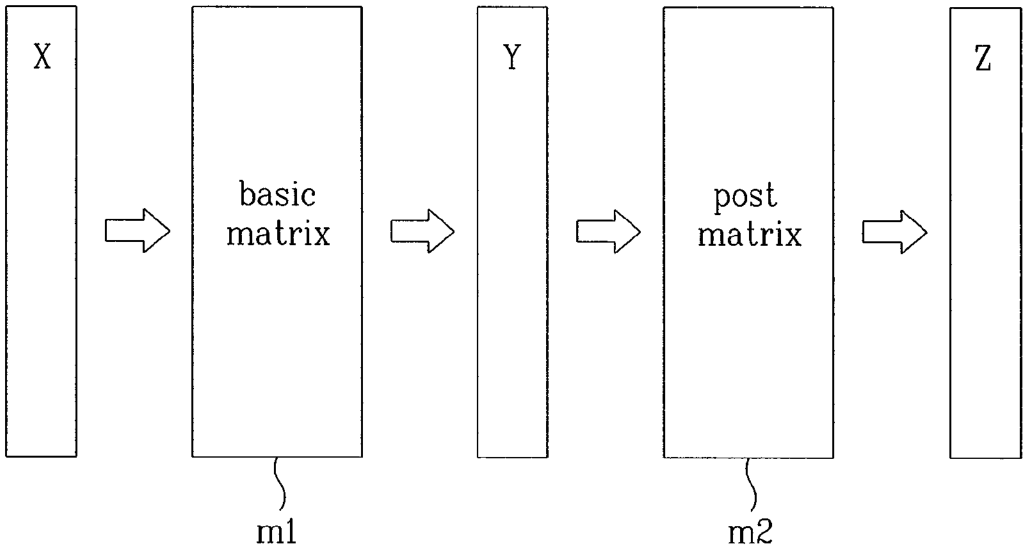
FIG. 4 is a conceptual diagram illustrating a method for creating a multi-channel signal according to another embodiment of the present invention.

FIG. 4 is a conceptual diagram illustrating a method for creating a multi-channel signal according to the present invention.

Referring to FIG. 4, an arbitrary output channel (y) is created by calculation between a down-mix signal (x) and a basic matrix (m1), and another arbitrary output channel (z) is created by calculation between a fixed output channel (y) and a post matrix (m2). Two or more basic matrixes (m1) may exist as necessary.

Configuration elements of the basic matrix (m1) may be acquired by using at least one of CLD, ICC, CPC and the above-mentioned fixed channel configuration information.

Configuration elements of the post matrix (m2) may be acquired by using CLD and the above-mentioned arbitrary channel configuration information.

A method for creating the arbitrary output channel will hereinafter be described in detail.

Firstly, a method for configuring an arbitrary channel using the arbitrary channel configuration information will be described in detail.

An exemplary method for representing the above-mentioned arbitrary channel configuration information using the above-mentioned branch priority method will be described.

The above-mentioned exemplary method sequentially recognizes the division ID and the non-division ID, which act as the configuration components of the arbitrary channel configuration information, and performs the signal processing according to the recognized ID.

If the recognized ID is determined to be the division ID, a single input channel is connected to the channel conversion module which is an example of the signal conversion, resulting in the creation of two lower channels.

Otherwise, if the recognized ID is determined to be the non-division ID, the above-mentioned input channel is outputted without any change of the number of channels.

A detailed description thereof will hereinafter be described.

At a first stage, an initial value of the number of IDs to be decoded is set to "1", and an initial value of the number of arbitrary output channels is set to "0", and an initial value of the number of channel conversion modules is set to "0".

At a second stage, an ID to be decoded is recognized.

At a third stage, if the recognized ID is determined to be the division ID, the number of channel conversion modules increases by 1, and the number of IDs to be recognized increases by 1.

If the recognized ID is determined to be the non-division ID, the number of arbitrary output channels increases by 1, and the number of IDs to be recognized is decreased by 1.

Until the number of IDs to be decoded reaches “0”, the above-mentioned second and third stages are repeated.

The above-mentioned signal processing method is repeated according to the number of fixed output channels.

For example, the arbitrary channel configuration acquired when the arbitrary channel configuration information is denoted by “11100010010000” is shown in FIG. 3. In this case, the “1” means the division ID, and “0” means the non-division ID.

The number of “1”s indicates the number of channel conversion modules (i.e., a signal conversion module of FIG. 3), and the number of “0”s indicates the number of arbitrary output channels.

Figure 5:
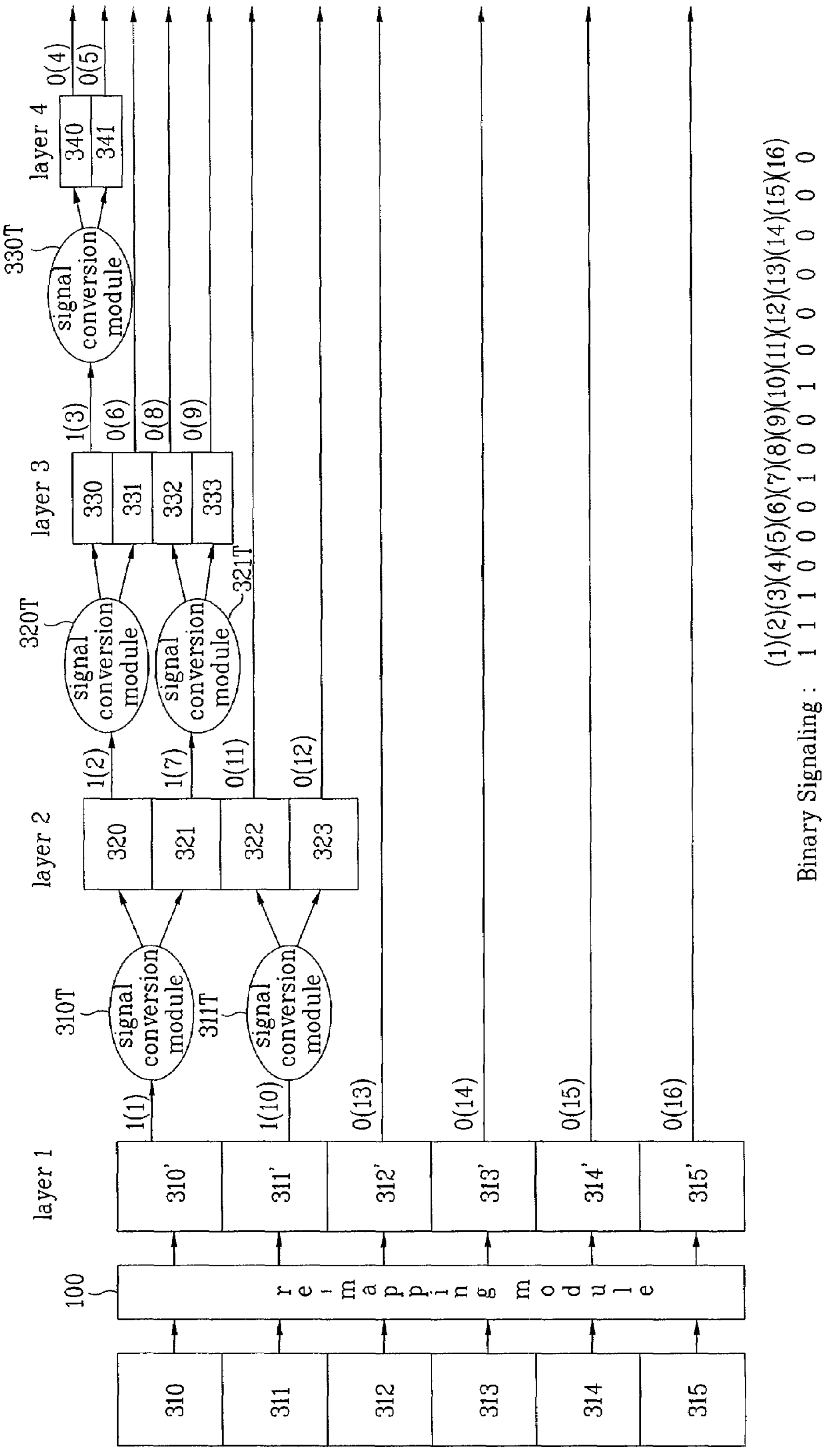
FIG. 5 is a conceptual diagram illustrating a signaling method for channel division information according to another embodiment of the present invention.

In the meantime, the fixed output channels may be rearranged (i.e., re-mapped) in different orders, and the arbitrary output channel may be then created, as shown in FIG. 5.

FIG. 5 is a conceptual diagram illustrating a method for signaling channel division information according to the present invention.

Referring to FIG. 5, the fixed output channels 310, 311, 312, 313, 314, and 315 are re-arranged by the re-mapping module 100. The re-arranged fixed output channels 310', 311', 312', 313', 314', and 315' act as the channels of the uppermost layer, such that the above-mentioned arbitrary output channel is created. Needless to say, the above-mentioned arbitrary output channels may be re-arranged or re-mapped in different orders.

In the meantime, if channel mapping information for mapping the channels of the arbitrary channel configuration information to a speaker is contained in the arbitrary channel configuration information, the arbitrary output channel may also be mapped to the speaker.

The above-mentioned description has disclosed an exemplary case in which the layer’s depth information is not additionally represented, and can be recognized by the arbitrary channel configuration information denoted by the division ID and non-division ID.

However, it should be noted that the other arbitrary channel configuration information for additionally representing the layer’s depth information can also be represented.

For example, the layer’s depth information is represented by a division-termination ID and a division-continuation ID.

The above-mentioned division-termination ID is indicative of the lowermost layer in which channel division is not performed any more. The above-mentioned division-continuation ID is indicative of the remaining layers except the lowermost layer. In this case, the division-continuation ID is denoted by “1”, and the division-termination ID is denoted by “0”.

The depth of the layer depicted in FIGS. 2~3 is “4”, and can also be represented by “1110” using the division-termination ID “0” and the division-continuation ID “1”.

In this way, in the case of additionally representing the depth information, only the non-division ID can be represented at a node assigned to the lowermost layer, such that the signaling process can be performed in the range from a current layer to a previous layer of the lowermost layer.

For example, provided that the division ID is denoted by “1” and the non-division ID is denoted by “0” and the division-continuation ID is denoted by “1”, and the division-termination ID is denoted by “0”, a specific value indicating whether the node assigned to the lowermost layer is divided may be represented by “0” indicating the division termination.

Although the above-mentioned situation actually occurs, the lowermost layer can be recognized by the above-mentioned depth information, and it is assumed that the omitted value “0” exists, such that the above-mentioned arbitrary output channel can be configured.

In the meantime, although the above-mentioned arbitrary channel configuration information is transmitted to the decoder, it should be noted that the decoder may not use the received arbitrary channel configuration information as necessary. The above-mentioned operations of the decoder may occur in an exemplary case in which the decoder recognizes the arbitrary channel configuration information and the size of the arbitrary channel configuration information, but skips over a predetermined range corresponding to the above-mentioned size.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

A signaling method for division information according to the present invention has the following effects.

Firstly, if a predetermined-sized long block is divided into different-sized short blocks, the above-mentioned signaling method according to the present invention can perform the signaling of the hierarchical block division information using minimum number of bits.

Secondly, the signaling method according to the present invention need not additionally transmit specific information indicating the number of bits used for the signaling process, and can recognize not only the depth of a divided layer by a signaled signal but also the end of the signaled signal.

Thirdly, the signaling method according to the present invention can divide a plurality of sub-bands into number of different-sized sub-bands (e.g., sub-bands having different frequency bandwidths) using a minimum number of bits.

Fourthly, the signaling method according to the present invention can perform the signaling of specific information associated with an upmixing process, which allows a signal received in input channel(s) to be outputted via many more output channels than the input channel(s).

What is claimed is:

1. A method for decoding an audio signal performed by an audio decoding apparatus, comprising:

receiving, in the audio decoding apparatus, a downmix signal and spatial information including fixed channel configuration information indicating a predetermined tree configuration and arbitrary channel configuration information including a type identifier comprising an arbitrary tree configuration, wherein the type identifier includes one of a division identifier and a non-division identifier, the division identifier indicating a channel division at a node of a layer and the non-division identifier indicating an absence of a channel division at a node of a layer;

generating, in the audio decoding apparatus, fixed output channels using the fixed channel configuration information and the downmix signal; and skipping decoding the arbitrary channel configuration information by recognizing, in the audio decoding apparatus, a length of the arbitrary channel configuration information, wherein a number of the fixed output channels is greater than a number of channels of the downmix signal.

2. The method of claim 1, wherein the spatial information further includes arbitrary channel configuration data corresponding to the arbitrary channel configuration information, and wherein the arbitrary channel configuration data comprises a channel level difference indicating a difference in energy between two channels.

3. The method of claim 1, further comprising mapping the arbitrary output channel to a speaker according to a channel mapping information.

4. An apparatus for decoding an encoded audio signal, comprising:

an audio signal receiving unit receiving a downmix signal and spatial information including fixed channel configuration information indicating a predetermined tree configuration and arbitrary channel configuration information including a type identifier comprising an arbitrary tree configuration, wherein the type identifier includes one of a division identifier and a non-division identifier, the division identifier indicating a channel division at a node of a layer and the non-division identifier indicating an absence of a channel division at a node of a layer;

a channel configuration unit configuring output channels using the fixed channel configuration information and the arbitrary channel configuration information, the configuring comprising:

generating fixed output channels using the fixed channel configuration information and the downmix signal; and skipping decoding the arbitrary channel configuration information by recognizing a length of the arbitrary channel configuration information, wherein a number of the fixed output channels is greater than a number of channels of the downmix signal.

5. The apparatus of claim 4, wherein the spatial information further includes arbitrary channel configuration data corresponding to the arbitrary channel configuration information, and wherein the arbitrary channel configuration data comprises a channel level difference indicating a difference in energy between two channels.

6. The apparatus of claim 4, further comprising mapping the arbitrary output channel to a speaker according to a channel mapping information.

* * * * *